Nov. 21, 1950     L. I. PICKERT     2,530,723

AIR BRAKE

Filed March 15, 1948

Inventor

Lynn I. Pickert

Dodge

Attorneys

Patented Nov. 21, 1950

2,530,723

UNITED STATES PATENT OFFICE 2,530,723

AIR BRAKE

Lynn I. Pickert, Watertown, N. Y., assignor to The New York Air Brake Company, a corporation of New Jersey Application March 15, 1948, Serial No. 14,950

6 Claims. (Cl. 303—68)

1

This invention relates to air brakes and particularly to an improvement on the release valve of the Pickert Patent 2,392,185, dated January 1, 1946.

In the allowed application of Klein, Serial No. 736,726, filed March 24, 1947, which issued on July 13, 1948 as Patent 2,444,993 to applicant's assignee, there is described and claimed a scheme for venting the retainer pipe of the related brake-controlling valve device when the release valve is in its brake releasing position. This makes it possible for the release valve to reset when the brake-controlling valve device moves to release position. It also makes it practicable and safe to use the release valves to free a train stopped on a grade with the retainers set. In certain cases this is advantageous because the retainers can remain set so as to become effective in ensuing cycles of grade braking.

The Klein proposal involved the use of a check valve. To cause such a valve to vent to a very low pressure, the valve-seating spring must be light. A light spring is apt to allow the valve to chatter and wear when the valve is not seated by pressure and the car is in motion. The present invention does away with the check valve and provides a wholly different valve for venting the retainer pipe. This valve can be spring-loaded so as never to chatter. In addition to this advantage the valve controls flow only from the retainer pipe, so that its failure could be significant only when retainers are set and then only as affecting the retaining action.

Practical embodiments of the invention are illustrated in the accompanying drawing in which.

Figure 1:
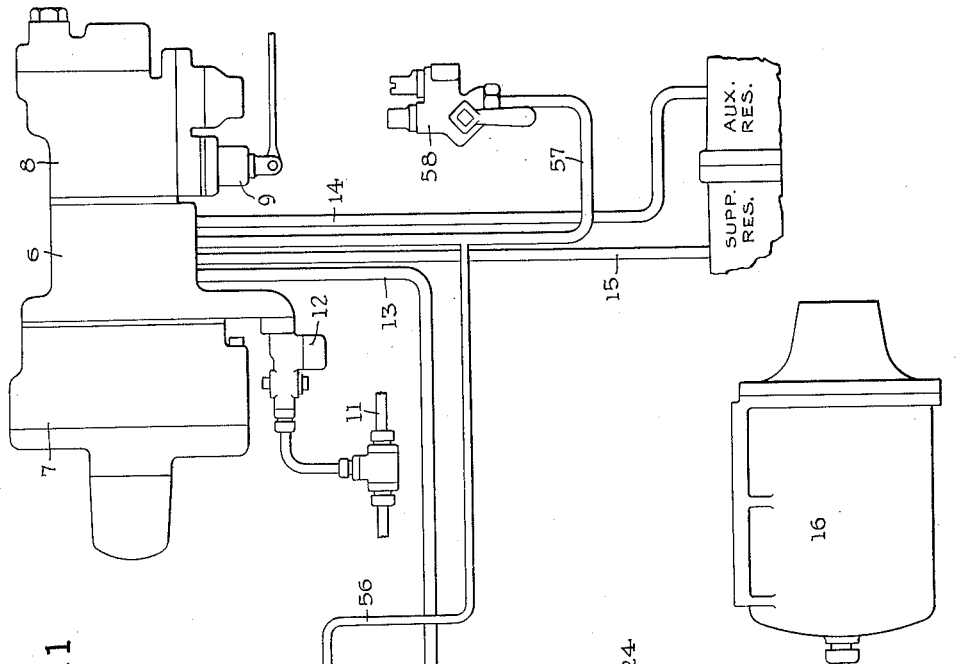
Fig. 1 is an axial vertical section of a release valve, constructed according to said Pickert patent, but with the present invention applied, the release valve being shown connected with an AB control valve, retainer valve, reservoirs and brake cylinder.

In both views the release valve is shown in normal (non-releasing) position. In Fig. 1 the control valve, retainer valve, brake cylinder and pipe connections (all of which follow commercial standards) are drawn in miniature to save space. The AB control valve typifies any automatic control valve or triple valve.

The pipe bracket of an AB control valve is indicated at 6, the body of the emergency portion is indicated at 7, and the body of the service portion at 8. The usual reservoir bleed valve is indicated at 9. This bleed valve need not be dispensed with, but it would be supplanted for most purposes by the release valve of the present invention.

The brake pipe is indicated at 11 and has a branch which leads through a dust collector 12 to the pipe bracket. The brake cylinder connection appears at 13, the auxiliary reservoir connection at 14, and the supplemental reservoir connection at 15. Fragments of the two reservoirs appear in the drawing and are identified by legends.

A brake cylinder is indicated at 16. The release valve is interposed between the brake cylinder connection 13 and the brake cylinder 16. The main body portion of the release valve is shown at 21 and is in the form of a cored casting, having a chamber 22 and a chamber 23. Pipe 23 communicates with chamber 22 and brake cylinder pipe 24 with chamber 23.

The chambers 22 and 23 are separated by a downwardly presented valve seat 26. This seat is shown as formed on an insert or spider 27 which is sealed by gaskets 28 and 29 and which is clamped by a body member 31 of the form clearly shown in the drawing.

The body member 31 is bolted to the top of the housing 21 and clamps the peripheral margin of a flexible diaphragm 32 shown as of the slack or corrugated type.

The lower side of the diaphragm is subjected to the pressure in the chamber 22. The diaphragm is subject on its upper side to pressure in a chamber 33 which is connected by a passage 34 with a chamber 35 formed in the lower end of the housing 21. The chamber 23 and the chamber 35 communicate with each other through the bore of a bushing 36 which is pressed into an opening extending between these two chambers. The bushing 36 has lateral ports 37 which communicate with an annular passage 38 and through the passage 38 with a passage 34 and consequently with the chambers 33 and 35.

Controlling discharge from the bottom of the chamber 35 is an upwardly presented valve seat 39 formed on the upper end of a bushing which is pressed to place. A valve body 41 carries on its lower end a rubber faced valve 42 which normally seals against seat 39 and carries at its upper end a rubber faced valve 43 which may close against the seat 26 at which time the valve 42 will be lifted from its seat 39.

The parts 41, 42 and 43 comprise what (for lack of a better term) will be called a "dual valve".

An upwardly extending stem 44 passes through the center of the diaphragm 32 and is clamped to the center of the diaphragm by a flanged sleeve 45, a thrust plate 46, which overlies the diaphragm, and a nut 47.

The plate 46 is biased downward by a coil compression spring 48, so that valve 42 is normally seated and the valve 43 open. Spring 48 reacts between plate 46 and a ported plate 49 which fits a marginal rebate formed in member 31 at the top of chamber 33. Over ported plate 49 is a flexible diaphragm 51, which is clamped at its margin by cap 52. In cap 52 is a valve chamber 53 to which a passage 54 leads through a valve seat 55. Passage 54 is connected by pipe 56 with the exhaust pipe 57 which leads from the control valve to a retainer 58 of any usual form.

The chamber 53 is vented to atmosphere at 59. A disc 61 is seated on diaphragm 51 and urged downward by coil compression spring 62. Disc 61 has a rubber-like sealing face 63 arranged to engage valve seat 55 when the plate is forced upward by the diaphragm 51. A pilot 64 is provided to hold the disc centered.

The lower end of valve body 41 makes a free fit in bushing 36, whereas the upper end, beneath valve 43 is reduced in diameter. A peripheral groove 66 defines an encircling flange 25. Flange 25 is so located that when valve 42 is closed the flange 25 fully exposes ports 37. A diagonal port 65 connects the annular clearance above flange 25 with groove 66. The flange also makes a free fit in the bushing 36. The flange is so located that if body 41 is moved up sufficiently to close valve 43 against seat 26 the ports 37 are throttled but not closed.

A housing 67 of the form shown is attached to the bottom of the housing 21 by machine screws, one of which appears at 68. The housing 67 has an internally flanged opening in its lower end in which is mounted a universally tiltable actuator comprising a ported head 69 which seats at its margin on the internal flange in housing 67 and which has at its lower end a fork 71 to which an actuating rod may be attached.

Resting on the head 69 is the lower end of a stem 72 which is guided by a guideway formed in a spider 73 clamped between the housings 21 and 67. The rim of the spider has through-ports as shown. The stem 72 is biased downwardly by a spring 74. If the head 69 is tilted in any direction the effect is to force the stem 72 upward, and since the stem 72 is aligned with the valve body 41, the effect of tilting the head 69 is to force the valve body 41 upward against the resistance of spring 48 so as to open the valve 42, throttle the ports 37 and close the valve 43.

Figure 2:
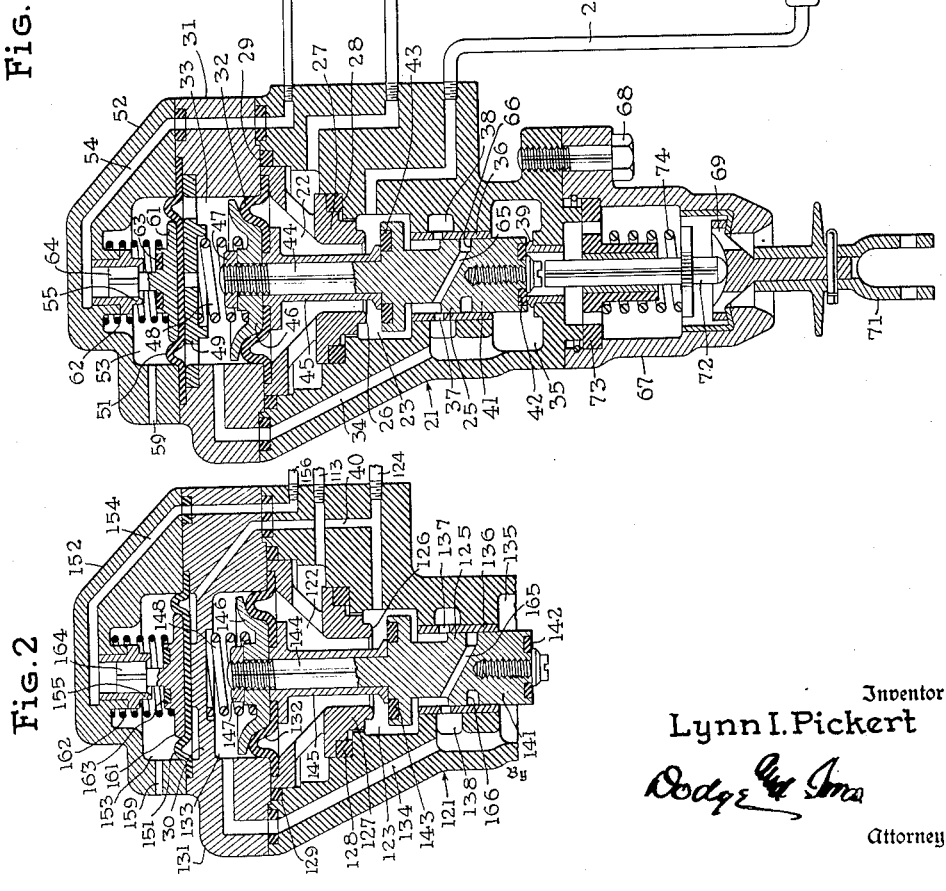
Fig. 2 is a fragmentary sectional view of a slightly modified release valve.

Modification of Fig. 2

The embodiment shown in Fig. 2 is basically the same and parts essentially identical with parts in Fig. 1 are identified by the same reference numbers increased by 100.

The differences are few and can be briefly stated. Instead of the ported plate 49 the member 131 has an imperforate partition 30 above chamber 133. Thus the diaphragm 151 is not directly subject on its lower side to pressure in chamber 133. Instead, it is subject to pressure in chamber 123 and brake cylinder 16 which are connected with it by a passage 40.

Actually the difference is not great, for chamber 23, passage 34 and chamber 33 of Fig. 1 are always in communication with brake cylinder 16 and hence at substantially the same pressure. The term "substantially" is used advisedly for retardation of flow through ports does produce moderate differentials of pressure, at times.

The second arrangement has a slightly better timing margin, but the first, on test, has demonstrated wholly satisfactory characteristics. Relatively remote chambers such as 33 and 23 or 133 and 123 are characterized by different rates of pressure rise and fall. These affect timing, but not enough to impair operative characteristics.

Operation

A description of operation with reference to Fig. 1 will suffice for both constructions.

Whenever cylinder 16 is under pressure, this pressure acting upward on diaphragm 51 (151) closes valve 63 (163), so there is then no secondary vent from the retainer pipe 57. This is true (assuming an ordinary three-position retainer) whether the retainer is in position 1 (free exhaust) position 2 (10 pounds retained), or position 3 (20 pounds retained).

Suppose a train stalls with retainers in position 3. If a brakeman leaves retainers in position 3, but operates several release valves by pulling their yokes 71 the corresponding valves 41 will move up and stay up, venting the related brake cylinders and blanking their pipes 13 by the closure of valves 43 on seats 26. Venting of brake cylinders permits the train to move, but it also opens valves 63, venting the corresponding retainer pipes 57. In grade cycling the engineer builds up brake pipe pressure to move the AB valves to release position and permit recharging of reservoirs. The resulting fall of pressure in chambers 23 (possible because the retainer pipes are vented) causes those release valves which had been manipulated, to reset. On the ensuing re-application those brakes which had been released by the release valves will re-apply, and the re-application will thereafter be retained by the set retainers.

The ultimate result is thus basically the same as that secured by the Klein construction, but the operation is more certain and is carried out by apparatus which is not affected by vibration.

The valve of the present invention attains all the results of the original Pickert device, affords an additional useful function, requires only one additional pipe (pipe 56), and incorporates the bleed valve for the retainer pipe in the vent valve structure, so that the whole device can be shipped and applied as an assembled, factory-tested unit.

The invention as embodied in Fig. 2 offers possibilities of arrangement which should not be overlooked. The valve 163 and its actuating diaphragm 151 are associated with the release valve in housings 121 and 131 only as a matter of convenience. From the standpoint of the two flow-connections 154 and 40, the valve 163 and its actuating diaphragm are more closely related to the retainer and to the brake cylinder than to the release valve. Hence the location of the unit here shown as mounted in cap 152 can be determined on a basis of convenience having regard to the locations of the brake cylinder, retainer and release valve on particular cars. These locations vary as an incident to the design of a car for some special service and the invention offers an opportunity to install according to the needs of any given case.

This amounts to saying that the valve 163, actuating diaphragm 151, biasing spring 162 and the necessary housing form a complete functional entity, namely a normally open valve which vents the retainer pipe independently of the retainer whenever the brake cylinder is vented, and closes as soon as the brake cylinder is put under pressure, so that the retainer is rendered potentially effective by a brake application and disabled by venting the brake cylinder, however this is effected.

Two practical embodiments of the invention have been described and the possibility of others has been explained. Hence the invention is broader than any particular embodiment. Its scope will be defined solely by the claims.

What is claimed is:

1. In an automatic air brake system, the combination of a brake pipe; an auxiliary reservoir; an automatic control valve connected with said brake pipe and auxiliary reservoir and having a brake cylinder connection and an exhaust connection; a brake cylinder connected with the brake cylinder connection; a retainer valve operable independently of any pressure in the system to control flow from said exhaust connection; a normally open secondary valve controlling an auxiliary vent from said exhaust connection; and a pressure motor subject to pressure in the brake cylinder and serving when subjected to pressure to close said secondary valve.

2. The combination of the structure defined in claim 1 and yielding means biasing said secondary valve toward its open position.

3. In an automatic air brake system, the combination of a brake pipe; an auxiliary reservoir; an automatic control valve connected with said brake pipe and auxiliary reservoir and having a brake cylinder connection and an exhaust connection; a brake cylinder connected with the brake cylinder connection; a retainer valve settable to control flow from said exhaust connection; a normally open secondary valve controlling an auxiliary vent from said exhaust connection; a pressure motor subject to pressure in the brake cylinder and serving when subjected to pressure to close said secondary valve; a dual valve interposed in the brake cylinder connection between the control valve and the brake cylinder, said dual valve having a normal position in which it opens said connection, and an abnormal position in which it closes said connection and vents the brake cylinder; manually operable means for shifting said dual valve to said releasing position; and resetting means for said dual valve, responsive to exhaust flow through said control valve and then serving to restore the dual valve to said normal position.

4. In an automatic air brake system, the combination of a brake pipe; an auxiliary reservoir; an automatic control valve connected with said brake pipe and auxiliary reservoir and having a brake cylinder connection and an exhaust connection; a brake cylinder connected with the brake cylinder connection; a retainer valve settable to control flow from said exhaust connection; a normally open secondary valve controlling an auxiliary vent from said exhaust connection; a pressure motor subject to pressure in the brake cylinder and serving when subjected to pressure to close said secondary valve; and a release mechanism interposed in the brake cylinder connection between the control valve and the brake cylinder, said mechanism comprising a dual valve having a normal position in which it opens said connection and an abnormal position in which it closes said connection and vents the brake cylinder, pressure-responsive means serving to retain said dual valve in abnormal position when in said position and subject to brake applying pressure by the control valve, and to restore it to normal position when said pressure is released by the control valve, and operator-operated means for moving said dual valve to abnormal position.

5. In an automatic air brake system, the combination of a brake pipe; an auxiliary reservoir; an automatic control valve connected with said brake pipe and auxiliary reservoir and having a brake cylinder connection and an exhaust connection; a brake cylinder connected with the brake cylinder connection; a retainer valve settable to control flow from said exhaust connection; a normally open secondary valve controlling an auxiliary vent from said exhaust connection; a pressure motor subject to pressure in the brake cylinder and serving when subjected to pressure to close said secondary valve; and a self-restoring releasing mechanism interposed in said connection and comprising an expansible chamber motor having two working spaces separated by a movable abutment the first working space being subject to braking pressures established by the brake controlling valve device, a dual valve connected with said abutment to be shifted thereby between two positions, namely a normal position assumed when the abutment is shifted toward the first working space and in which the dual valve connects the brake cylinder and the brake controlling valve device and also connects the two working spaces, and an abnormal position in which the valve interrupts the two connections just mentioned and vents the brake cylinder and the second working space, yielding means insufficient to resist effective braking pressure in the first braking space and serving to bias the abutment toward said normal position and manually operable means for causing said valve to shift to said abnormal position.

6. In an automatic air brake system, the combination of a brake pipe; an auxiliary reservoir; an automatic control valve connected with said brake pipe and auxiliary reservoir and having a brake cylinder connection and an exhaust connection; a brake cylinder connected with the brake cylinder connection; a retainer valve settable to control flow from said exhaust connection; a normally open secondary valve controlling an auxiliary vent from said exhaust connection; a valve closing pressure motor serving when subjected to pressure to close said secondary valve; a self-restoring releasing mechanism interposed in said connection and comprising an expansible chamber motor having two working spaces separated by a movable abutment the first working space being subject to braking pressures established by the brake controlling valve device, a dual valve connected with said abutment to be shifted thereby between two positions, namely a normal position assumed when the abutment is shifted toward the first working space and in which the dual valve connects the brake cylinder and the brake controlling valve device and also connects the two working spaces, and an abnormal position in which said valve interrupts the two connections just mentioned and vents the brake cylinder and the second working space, yielding means insufficient to resist effective braking pressure in the first braking space and serving to bias the abutment toward said normal position and manually operable means for causing said valve to shift to said abnormal position; and a pressure-transmitting connection between said second working space and said valve-closing motor.

LYNN I. PICKERT.

REFERENCES CITED

The following references are of record in the file of this patent:

UNITED STATES PATENTS

| Number | Name | Date |
| --- | --- | --- |
| 1,131,181 | Turner | Mar. 9, 1915 |
| 2,392,185 | Pickert | Jan. 1, 1946 |